United States Patent [19]

Huchital

[11] 4,209,747

[45] Jun. 24, 1980

[54] APPARATUS AND METHOD FOR DETERMINATION OF SUBSURFACE PERMITTIVITY AND CONDUCTIVITY

[75] Inventor: Gerald S. Huchital, Brookfield, Conn.

[73] Assignee: Schlumberger Technology Corporation, New York, N.Y.

[21] Appl. No.: 835,128

[22] Filed: Sep. 21, 1977

[51] Int. Cl.$^2$ .......................... G01V 3/18; G01V 3/12
[52] U.S. Cl. ................................................... 324/338
[58] Field of Search ............................................ 324/6

[56] References Cited

U.S. PATENT DOCUMENTS

| | | | |
|---|---|---|---|
| 3,096,502 | 7/1963 | Vogel . | |
| 3,187,252 | 6/1965 | Hungerford | 324/6 |
| 3,304,536 | 2/1967 | Kokesh . | |
| 3,524,162 | 8/1970 | Zill . | |
| 3,551,797 | 12/1970 | Gouilloud et al. | 324/6 |
| 3,849,721 | 11/1974 | Calvert | 324/6 |
| 3,944,910 | 3/1976 | Rau | 324/6 |
| 3,982,176 | 9/1976 | Meador | 324/6 |
| 3,993,944 | 11/1976 | Meador et al. | 324/6 |
| 4,012,689 | 3/1977 | Cox et al. | 324/6 |
| 4,107,597 | 8/1978 | Meador et al. | 324/6 |
| 4,107,598 | 8/1978 | Meador et al. | 324/6 |

FOREIGN PATENT DOCUMENTS

330245 4/1972 U.S.S.R. ..................................... 324/6

OTHER PUBLICATIONS

Meador et al., *Dielectric Constant Logging, A Salinity Independent Estimation of Formation Water Volume*, Soc. of Petr. Eng. of AIME, Paper No. SPE5504, 1975.

*Primary Examiner*—Gerard R. Strecker

[57] ABSTRACT

The disclosure is directed to an apparatus and method for determining dielectric constant and/or conductivity of earth formations surrounding a borehole. Electromagnetic energy is generated at a first location in the borehole. The relative attenuation of the electromagnetic energy is detected at a second location in the borehole. The detection is preferably performed using a first or "close" differential receiver arrangement. The relative phase of the electromagnetic energy is detected at a third location in the borehole, the third location being spaced farther from the first location than is the second location; in other words, the second location is between the first and third locations. The relative phase shift of the electromagnetic energy is measured by a second or "far" differential receiver arrangement located at the third location in the borehole. Means are provided for determining the dielectric constant and/or the conductivity of the formations as a function of the detected relative attenuation and relative phase. The dielectric constant and/or conductivity are determined with improved accuracy as compared to prior art techniques, since the attenuation and relative phase information is representative of the effects of formations at substantially the same depth of investigation from the borehole. In a further embodiment of the invention, the attenuation of the electromagnetic energy is also detected at the third location and then combined with the other information to obtain an "ultra deep" conductivity value.

38 Claims, 12 Drawing Figures

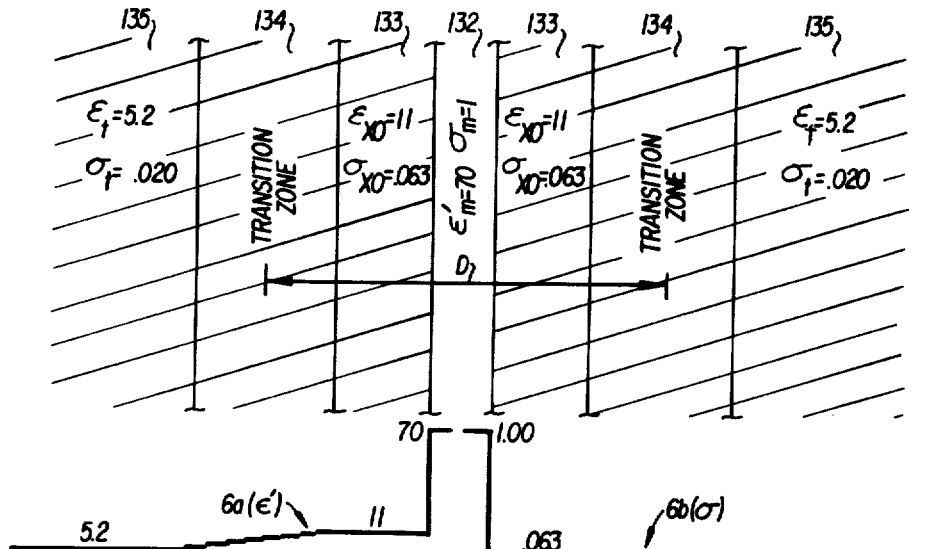
FIG. 6
FIG. 7
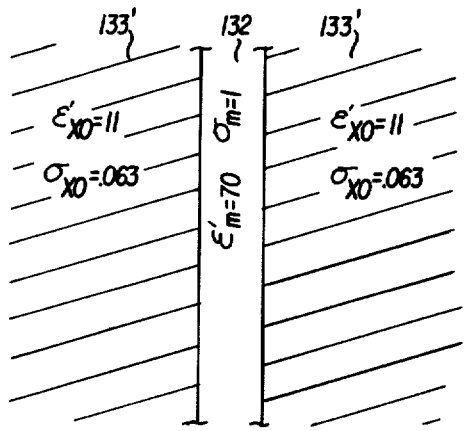
FIG. 8
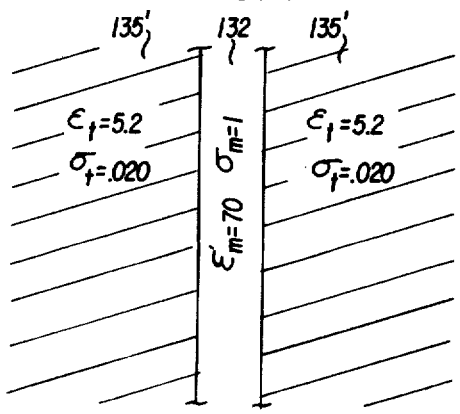

APPARATUS AND METHOD FOR DETERMINATION OF SUBSURFACE PERMITTIVITY AND CONDUCTIVITY

BACKGROUND OF THE INVENTION

This invention relates to the investigation of the properties of earth formations surrounding a borehole and, more particularly, to an apparatus and method for determining the dielectric constant and/or conductivity of formations surrounding a borehole using radio frequency electromagnetic energy. The subject matter of the present invention is related to subject matter disclosed in the copending U.S. Patent Application Ser. No. 835,127, of G. Huchital and J. Tabanou, filed of even date herewith and assigned to the same assignee as the present invention.

It is well known to log or record certain electrical characteristics of earth formations surrounding a well borehole as a function of depth in order to determine the location and extent of oil-bearing strata. A log of formation resistivity versus depth may indicate the presence of hydrocarbons, since hydrocarbon-bearing formations typically exhibit a higher resistivity than formations containing mostly salt water. If the formation connate water is relatively fresh, however, there can be ambiguities in interpreting results since there may be insufficient contrast between the resistivity of the hydrocarbons and the resistivity of the water.

Ambiguities of resistivity logs in fresh water zones and other factors have led to an increasing interest in the development of techniques for obtaining measurements of the dielectric constant or electric permittivity of subsurface formations. The dielectric constant of different materials commonly found in earth formations vary widely. For example, the dielectric constant of oil is on the order of 2.2 while the dielectric constant of limestone is on the order of 7.5. In contrast, the dielectric constant of water is on the order of 80 and is largely independent of the salinity (and resistivity) of the water. Thus, measurement of dielectric properties of formations holds much promise of being a useful means of formation evaluation.

In the U.S. Pat. No. 3,944,910 of R. Rau, assigned to the same assignee as this application, there is disclosed an investigating apparatus capable of determining, inter alia, the dielectric constant of formations surrounding a borehole by injecting microwave electromagnetic energy into the formations and measuring the relative phase shift and attenuation of the wave energy as it propagates through the formations. This apparatus has demonstrated its effectiveness as a well logging tool, but certain practical limitations pertaining to frequency of operation, antenna spacing, etc., result in that well logging tool having its main application in determining the dielectric constant of formations relatively near the surface of the borehole wall. Stated another way, the microwave electromagnetic propagation device described in U.S. Pat. No. 3,944,910 is a relatively "shallow" investigation tool which primarily determines characteristics of the "invaded zone" surrounding the borehole, this being the zone in which borehole drilling fluids typically have displaced at least a portion of the fluids originally present in the formations. The microwave frequencies employed in the Rau patent render it difficult to investigate deeper than the invaded zone since the relatively longer transmitter to receiver spacings needed for a deeper investigation tend to become impractical since microwave signals attenuate relatively quickly in the formations. While information concerning the invaded zone can be extremely valuable, it would be additionally advantageous to obtain an indication of the dielectric constant of formations which are further from the borehole; i.e. in the virgin or "uninvaded" formations, or at least formations which are subject to less invasion than the formations in very close proximity to the borehole.

Even before development of the techniques disclosed in the referenced U.S. Pat. No. 3,944,910, it had been proposed that propagating electromagnetic energy, at frequencies typically below the microwave range, could be injected into the formations with a view toward measuring the properties of propagation of the energy in the formations. For example, in the U.S. Pat. No. 3,551,797 of Gouilloud et al., there is disclosed a technique wherein electromagnetic energy is transmitted into the formations and energy shed back into the borehole is measured at two spaced receivers to determine the relative attenuation and/or the relative phase of the electromagnetic energy propagating in the formations. Gouilloud et al. teaches that by using different transmitter-to-receiver spacings, different depths of investigation into the borehole can be attained. For example, a relatively closer spaced receiver pair can be utilized to obtain attenuation and/or phase information from which properties of the invaded zone are determined and measurements of attenuation and/or phase from a relatively further spaced pair of receivers can be utilized to obtain the properties of the deeper uninvaded formations. In the patent of Gouilloud et al., the concern is largely with obtaining conductivity. Either attenuation or phase can be utilized therein to determine the skin depth of the formations, with conductivity then being determinable from the skin depth. Below a certain frequency range, the skin depth of the electromagnetic energy can be calculated using either attenuation or phase information since displacement currents have minimal effect.

Reviewing up to this point, the prior art discussed so far shows that electromagnetic energy propagated in formations of interest can be measured to determine the conductivity of the formations (e.g. the Gouilloud et al. U.S. Pat. No. 3,551,797), and much higher microwave frequency electromagnetic energy can be propagated in the formations, and especially the invaded zone thereof, to determine the dielectric constant thereof (e.g. the Rau U.S. Pat. No. 3,944,910). There have also been various proposals for using electromagnetic energy at frequencies intermediate those discussed so far, i.e. radio frequency electromagnetic energy in the range between about 10 MHz and 100 MHz, to determine the dielectric constant and/or the conductivity of formations surrounding a borehole. In this frequency range, dielectric constant and conductivity both have a substantial effect upon the propagation constant of electromagnetic energy propagating in the formations, so measurements of attenuation and phase can be used for solution of simultaneous equations to determine the dielectric constant and/or conductivity of formations through which the electromagnetic energy has passed. Also, in this frequency range signal attenuation is much less severe than in the case of microwave electromagnetic energy, so transmitter-to-receiver spacings can be substantially greater with concomitant improvements in depth of investigation. The use of frequencies in the radio frequency range above 10 MHz is disclosed, for example in various Russian publications: e.g. Daev "Dielectric Induction Logging" Izv. MVO SSSR, Ser. Geologiya Razvedka (1965); Antonov and Daev "Equipment for Dielectric Induction Logging", Geofiz. Apparatura, No. 26 (1965); Antonov and Izyumov "Two Frequency Dielectric Induction Logging with Two Sondes", Geol. Geofiz., No. 4 (1968); Daev "Physical Principles of Electromagnetic Wave Logging", Geol. Razved, No. 4 (1970). More recently, a number of patents have issued, among them U.S. Pat. Nos. 3,891,916; 3,982,176; 3,893,021; 3,982,176; 3,993,944; 4,009,434 and 4,012,689, which utilize electromagnetic energy in the radio frequency range between about 10 MHz and 60 MHz to determine the dielectric constant and/or the conductivity of formations surrounding a borehole. Briefly, the techniques in the Russian publications and the listed patents generally recognize that dielectric constant and conductivity are two unknowns in the wave propagation equation. A basic approach is to establish two or more equations from which the unknowns can be simultaneously solved. In one instance, the amplitude and phase of wave energy are each measured so that two equations can be set up. In another instance, the amplitude at two different spacings is utilized, in a further instance conductivity is obtained from a low frequency induction device and measurements in the radio frequency range are utilized as other inputs in solving for dielectric constant.

In the described prior art techniques, the depth of investigation of a particular logging device, at a given frequency, is generally understood to be determined by transmitter-to-receiver spacings. At least two types of basic considerations pertaining to depth of investigation are evident in the prior art. First, when it is desired to obtain values of formation characteristics such as conductivity or dielectric constant, different spacings can be intentionally used to determine these characteristics at different depths of investigation (as discussed briefly above). For example, a relatively short spacing logging device can be used to measure formation characteristics in the invaded zone and a relatively long spacing logging device can be used to measure formation characteristics in the non-invaded zone. Secondly, in some techniques measured values are, of necessity, indicative of readings at different depths of investigation, such as where different logging devices are employed to obtain different formation characteristics that are utilized together in formation evaluation. When the measured values are combined to yield formation characteristics, the different depths of investigation are considered as introducing error. This would appear to follow logically since some of the readings used to evaluate formations may be coming from one depth of investigation and other readings coming from another depth of investigation where the formations might be of a different nature.

It is an object of the present invention to provide an apparatus and method for investigating earth formations utilizing radio frequency electromagnetic energy, the apparatus and method employing an improved technique for determining parameters such as dielectric constant and/or conductivity with assurance that the measurements used for such determination are "looking" at substantially the same formations; i.e., having substantially the same depth of investigation.

SUMMARY OF THE INVENTION

Applicant has discovered that when radio frequency electromagnetic energy is emitted from a first location in a borehole into the surrounding formations and then received at a second location in the borehole, the volume and shape of the formations which affect a measurement of wave energy attenuation as measured at the second location is different than the volume and shape of the formations which affect a measurement of relative phase of the electromagnetic wave energy received at the second location. In particular, the attenuation measurement is more affected by portions of the formations further from the borehole than are measurements of phase; i.e., the attenuation measurement "looks" deeper into the formations than does the phase measurement.

It is known in the art that two measurements of electromagnetic energy of a particular frequency can be utilized to determine the dielectric constant and conductivity of formations surrounding a borehole. To applicant's knowledge, it has in the past been considered appropriate to combine measurements from a particular receiver location to obtain the dielectric constant and conductivity of surrounding formations to a certain depth of investigation.

Applicant's discovery indicates, inter alia, that previously used techniques tend to introduce inaccuracies due to the fact that the input phase information is "looking" at somewhat different formations than the input attenuation information. The effect is believed to be more pronounced as spacings become wider; i.e., as it is attempted to look "deeper" into the formations. Applicant's invention makes use of this discovery to eliminate such inaccuracies and, in embodiments thereof, produces values of dielectric constant and/or conductivity which are based upon attenuation and phase measurements having substantially the same depth of investigation and vertical extent.

The invention is directed to an apparatus and method for determining properties, in particular dielectric constant and/or conductivity, of earth formations surrounding a borehole. In accordance with the apparatus of the invention, means are provided for generating electromagnetic energy at a first location in the borehole. Further means are provided for detecting a first parameter, preferably relative attenuation, of the electromagnetic wave energy at a second location in the borehole. Preferably, the detection is performed using a first or "close" differential receiver arrangement, the second location being defined by about the center of said "close" differential receiver arrangement. Means are also provided for detecting a second parameter of the electromagnetic energy at a third location in the borehole, the third location being spaced farther from the first location than is the second location; in other words, the second location is between the first and third locations. Preferably, the second parameter is the relative phase shift of the electromagnetic wave energy, and it is measured by a second or "far" differential receiver arrangement located at the third location in the borehole. The third location is defined by about the center of the "far" differential receiver arrangement. Further means are provided for determining properties of the formations as a function of the first and second parameters. Preferably, the dielectric constant and/or conductivity of the formations are determined, and these results provide improved accuracy as compared to prior art techniques, since the attenuation and relative phase information is representative of the effects of formations at substantially the same depth of investigation from the borehole.

In the preferred embodiment of the invention the second location is spaced approximately halfway between the first and third locations. In this embodiment a frequency of about 20 MHz is employed and the four receivers (comprising two differential receiver arrangements) are approximately equally spaced apart with about a two foot spacing between adjacent receivers.

In a further embodiment of the invention, the attenuation of the electromagnetic energy is also detected at the third location and then combined with the other information to obtain an "ultra deep" conductivity value.

Further features and advantages of the invention will become more readily apparent from the following detailed description when taken in conjunction with the accompanying drawings.

BRIEF DESCRIPTION OF THE DRAWINGS

FIGS. 6, 7 and 8 are simplified models useful in developing normalized phase and attenuation values.

DESCRIPTION OF THE PREFERRED EMBODIMENT

Figure 1:
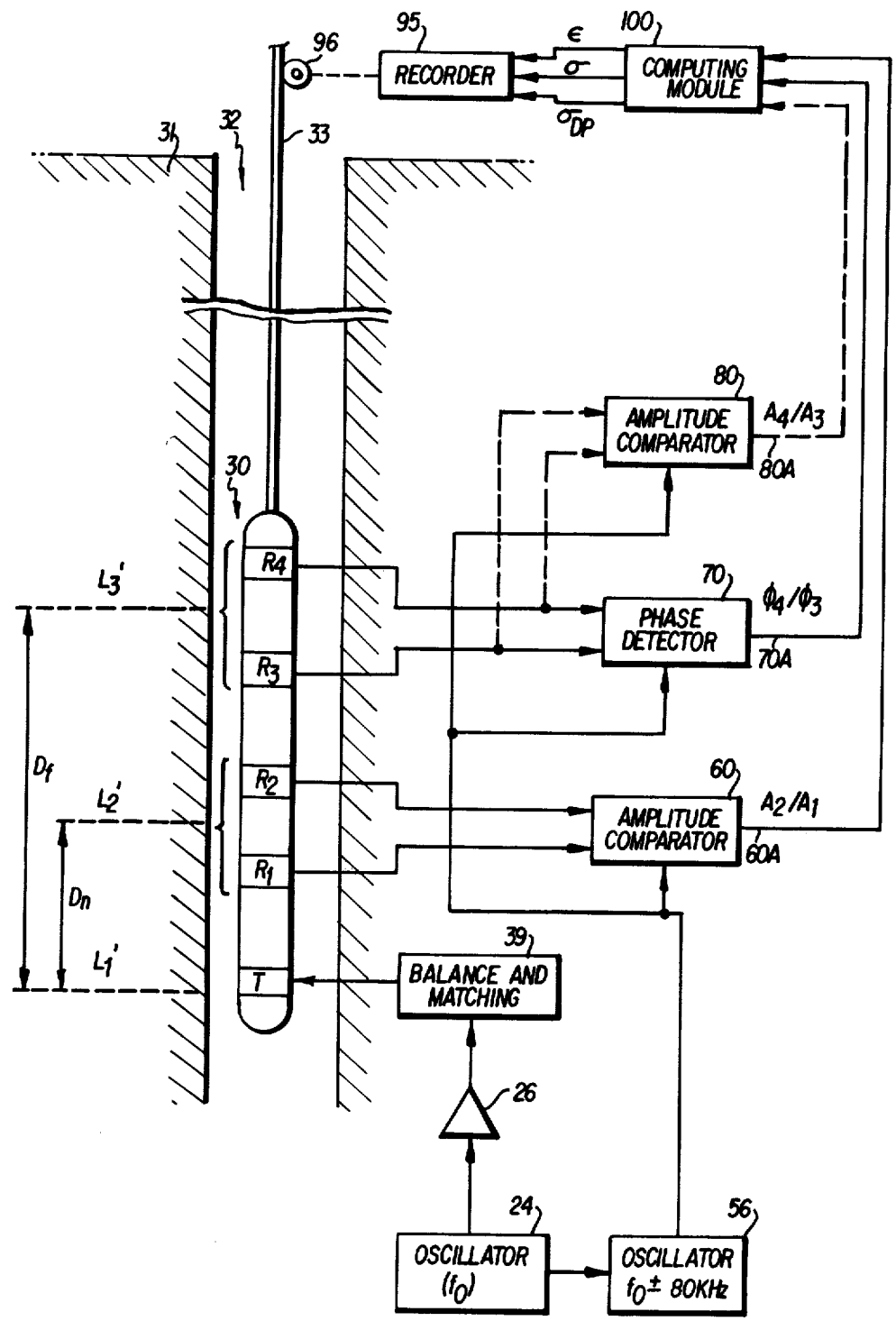
FIG. 1 is a block diagram of an apparatus in accordance with an embodiment of the invention.

Referring to FIG. 1, there is shown a representative embodiment of an apparatus in accordance with the present invention for investigating subsurface formations 31 traversed by a borehole 32. The borehole 32 may be filled with air or, more typically, drilling mud which may be either water-based mud or oil-based mud. Also, the borehole may be open or cased with a nonconductive material. The investigating apparatus or logging device 30 is suspended in the borehole 32 on an armored cable 33, the length of which substantially determines the relative depth of the device 30. The cable length is controlled by suitable means at the surface such as a drum and winch mechanism (not shown). The armored cable 33 is rewound on the drum to raise the device 30 toward the surface as formation characteristics are measured. Depth measurements are provided by a measure wheel 96 which is rotated as a result of contact with cable 33. Pulses provided by rotation of measure wheel 96 are applied to a recorder to provide a record of the depths at which measurements are being taken.

The logging device 30 may be a sonde which carries a transmitter T, a first or near pair of receivers $R_1$, $R_2$, and a second or far pair of receivers $R_3$, $R_4$. The transmitter T and the receivers $R_1$, $R_2$, $R_3$ and $R_4$ are preferably, but not necessarily, coils. The transmitter is designated herein as being located in the borehole at a first location, $L_1'$, the near receiver pair is designated as being located at a second location, $L_2'$, and the far receiver pair is designated as being located at a third location, $L_3'$. The second and third locations are actually regions within which the respective receiver pairs are located and, for convenience, $L_2'$ is defined as having a reference position or depth level at the midpoint between $R_1$ and $R_2$, whereas $L_3'$ is defined as having a reference position or depth level at the midpoint between $R_3$ and $R_4$. Relative spacing of the receiver pair will be treated hereinbelow, but preferably the spacing $D_n$ between the transmitter T and the receiver pair $R_1$, $R_2$, is of the order of one-half the spacing $D_f$ between the transmitter T and the receiver pair $R_3$, $R_4$.

The transmitter T is driven by a circuit which includes an oscillator 24, which may be of a crystal-controlled type, that generates a radio frequency signal in the range of 10 MHz–100 MHz, and preferably about 20 MHz. The output of oscillator 24 is amplified by amplifier 26 and then coupled to the transmitter T via a balance and matching network 39. An oscillator 56, which is synchronized with oscillator 24, provides an output signal having a frequency which differs from the frequency of signals provided by oscillator 24 by a relatively low frequency, for example 80 KHz. As will be described, the output of oscillator 56 is mixed with the signals from the receivers to generate a further signal having a phase and amplitude related to the phase and amplitude of the receiver outputs but a much lower frequency (80 KHz) which simplifies the amplitude and phase detection operations.

An amplitude comparator circuit 60 functions to measure the relative attenuation of electromagnetic wave energy detected at the receivers $R_1$ and $R_2$ and provides an amplitude ratio signal ($A_2/A_1$), where $A_2$ and $A_1$ are peak amplitudes sensed at the receivers $R_2$ and $R_1$ respectively. A phase detector circuit 70 functions to measure the difference in phase between electromagnetic waves detected at receivers $R_3$ and $R_4$. According to an embodiment of the invention, the outputs of receivers $R_3$ and $R_4$ may also be applied to a second amplitude comparator circuit 80 which, as will be further described, is used in deriving an "ultra-deep conductivity" measurement.

For ease of illustration, the described transmitter and receiver circuitry are illustrated as being set apart from device 30, although such circuitry is generally located within the logging device. The circuitry is electrically coupled to surface instrumentation, including a computing module 100, through conductors 60A, 70A and 80A which are included within the armored cable 16.

The computing module 100 combines the relative attenuation signal provided by amplitude comparator 60 and the phase difference signal provided by phase detector 70 to derive dielectric constant and conductivity values for the formation at a particular depth of investigation in the surrounding formation. Also, the output signal of amplitude comparator 80 can be combined with the derived dielectric constant value to obtain an ultra-deep conductivity value for the formations.

The calculated values of dielectric constant and conductivity are applied to a recorder 95 which also receives depth indicating signals from the measure wheel 96. The recorder 95 provides a log of dielectric constant values and conductivity values for the formations surrounding the borehole as a function of depth. It will be understood that the computing module and/or recording or storage capabilities can be located at remote locations.

Figure 2:
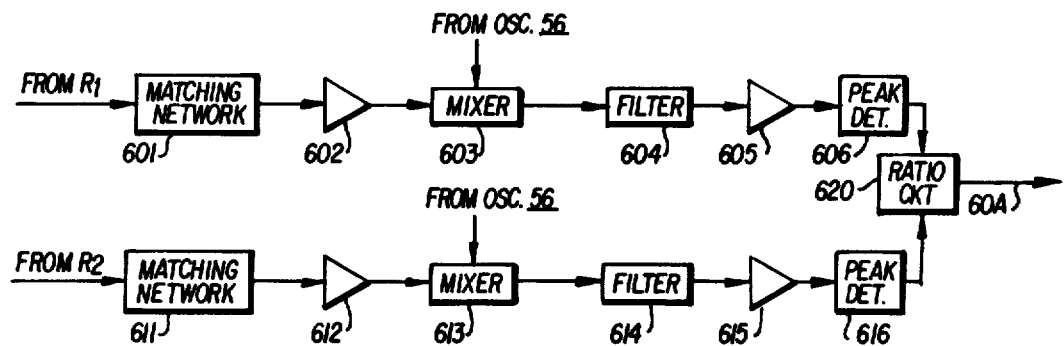
FIG. 2 is a block diagram of an embodiment of the amplitude comparator 60 of FIG. 1.

FIG. 2 discloses an embodiment of the amplitude comparator circuit 60. The signal from receiver $R_1$ is coupled to the input of a first balance and matching network 601 and the signal from receiver $R_2$ is coupled to the input of a second balance and matching network 611. The outputs of matching networks 601 and 611 are preamplified by preamplifiers 602 and 612. To simplify the process of amplitude detection, the outputs of preamps 602 and 612 are coupled to mixer circuits 603 and 613, respectively, which receive as their other inputs the signal from oscillator 56 which is at a frequency $f_0 \pm 80$ KHz, i.e. 80 KHz above or below the transmitter frequency. The mixing of the two signals produces, in each case, an output signal having an amplitude and phase related to the amplitude and phase of the signal detected at a respective receiver, but a frequency of 80 KHz. The outputs of mixer 603 and 613 are filtered by band pass filters 604 and 614 and then coupled, by IF stage amplifiers 605 and 615 to peak detectors 606 and 616, respectively. The peak detectors provide output signals representative of the wave energy envelopes. The outputs of the peak detectors are coupled to a ratio circuit 620 which generates the signal on line 60A (FIG. 1) that is representative of the amplitude ratio of the wave energy received at $R_2$ and $R_1$.

Figure 3:
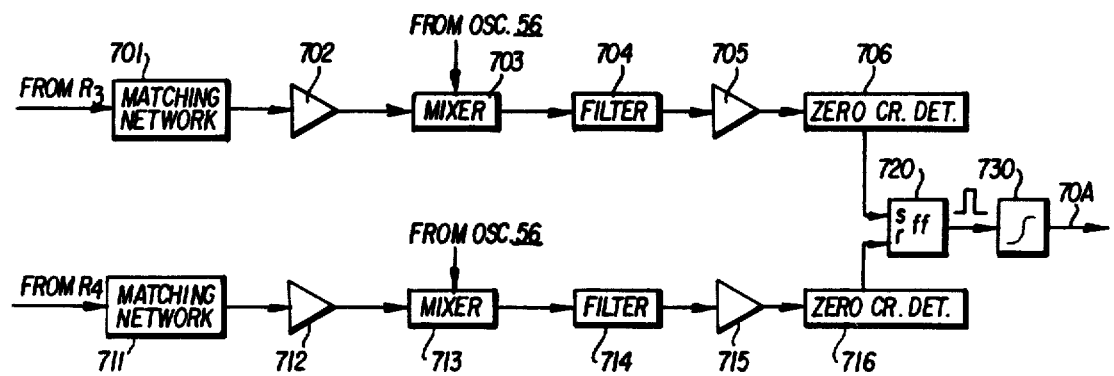
FIG. 3 is a block diagram of an embodiment of the phase detector 70 of FIG. 1.

FIG. 3 discloses an embodiment of the phase comparator circuit 70 of FIG. 1. The signal from receivers $R_3$ and $R_4$ are respectively coupled to the inputs of impedance matching networks 701 and 711. In a manner similar to FIG. 2, the output of balance and matching network 701 is coupled to preamplifier 702, mixer 703, filter 704 and IF amplifier 705, while the output of balance and matching network 711 is coupled to preamplifier 712, mixer 713, filter 714 and IF amplifier 715. The outputs of amplifiers 705 and 715 are respectively coupled to zero crossing detectors 706 and 716. The output of zero crossing detector 706 is coupled to the set terminal of a flip-flop 720, and the output of the zero crossing detector 716 is coupled to the reset terminal of the flip-flop 720. The zero crossing detectors are operative to generate an output only for excursions through zero in the positive-going direction. Accordingly, during each cycle the energy arriving first at receiver $R_3$ will result in an output of zero crossing detector 706 which, in turn, sets the flip-flop 720. When the signal subsequently arrives at receiver $R_4$, the resultant output of zero crossing detector 716 will reset the flip-flop 720. Accordingly, the output of flip-flop 720 is a pulse having a duration which represents the phase difference between the two signals. The output of flip-flop 720 is coupled to an integrator 730 whose output is the signal 70A; i.e., an analog signal representative of the phase difference as between the signals received at receivers $R_4$ and $R_3$. It will be understood that the advantageous noise-eliminating technique described in the Calvert U.S. Pat. No. 3,849,721, with or without borehole compensation techniques, can be employed, if desired. If borehole compensation is utilized, a second transmitter can be located on the opposite side of the receivers, and the receiver pairs can be adapted to alternately reverse roles as the transmitters are switched. Alternatively, one could, if desired, employ a time-processed borehole-compensation technique of the type described in the copending U.S. Patent Application Ser. No. 922,114, which is a continuation of U.S. Ser. No. 687,471, now abandoned, of N. Schuster, assigned to the same assignee as the present application. Further, it will be understood that the signals on lines 60A, 70A or 80A can, if desired, be digitized before transmission to the surface, using known telemetering techniques.

Figure 4:
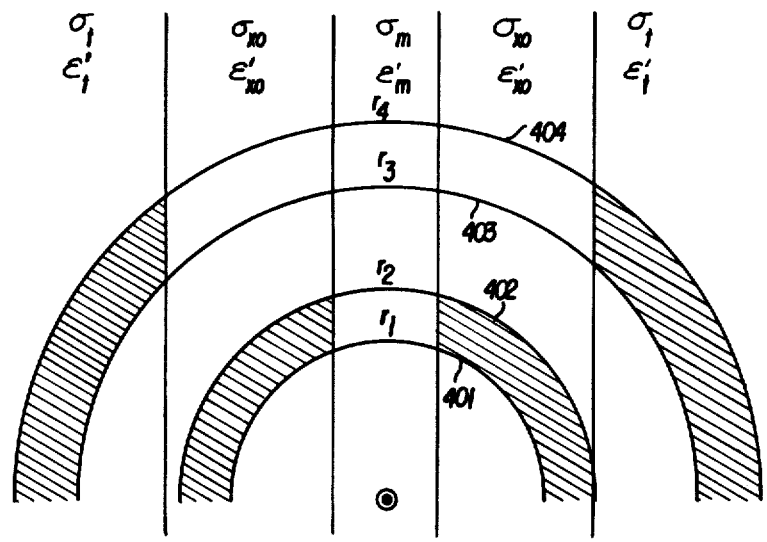
FIG. 4 is a simplified cross section through a borehole which illustrates lines of constant phase of electromagnetic wave energy.
Figure 5:
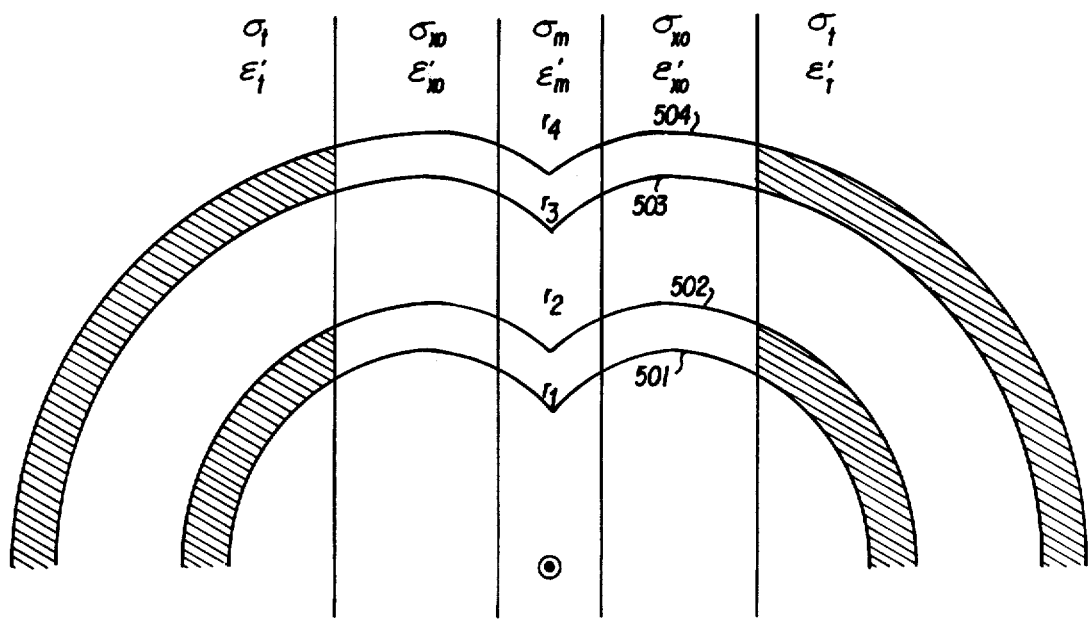
FIG. 5 is a simplified cross section through a borehole which illustrates lines of constant amplitude of electromagnetic wave energy.

The amplitude comparator 80 may be of the same form as shown in FIG. 2. For efficiency of design, the comparator 80 may share portions of the circuitry of the circuits 60 and/or 70. FIGS. 4 and 5 illustrate, in simplified form, the general nature of the amplitude and phase measurements, at the frequency range of interest herein, and are useful in understanding relative depths of investigation attributable to amplitude and phase measurements of signals transmitted from the same location in the same formations. In each figure there is depicted a borehole filled with borehold fluid having conductivity $\sigma_m$ and dielectric constant $\epsilon_m'$, an invaded zone having conductivity $\sigma_{xo}$ and dielectric constant $\epsilon_{xo}'$, and an uninvaded virgin formation having conductivity $\sigma_t$ and dielectric constant $\epsilon_t'$. FIG. 4 shows, in simplified terms and ignoring geometric effects, the general shape of lines of constant phase of electromagnetic wave energy which would result from a vertical magnetic dipole source located at an origin position "O". The lines of constant phase are seen to be generally circular in shape and indicate, for example, that the phase difference as between signals received at positions designated $r_1$ and $r_2$ in the borehole is related to the phase difference attributable to the formations between the lines 401 and 402; i.e., largely the invaded formations, to the essential exclusion of the uninvaded formations. Similarly, the phase difference as between signals received at positions designated $r_3$ and $r_4$ in the borehole is related to the phase difference attributable to the formations between lines 403 and 404, and including the "band" in the uninvaded formations depicted by the cross hatched portions. The differential nature of the comparison of the signals tends to cancel the effect of the non-crosshatched regions. In FIG. 5, where lines of constant amplitude are shown (again, neglecting geometrical effects for clarity of illustration) positions in the borehole corresponding to $r_1$, $r_2$, $r_3$ and $r_4$ are again illustrated. The difference in amplitude as between the positions $r_1$ and $r_2$ corresponds to the difference in amplitude attributable to formations lying between the lines 501 and 502 so that, for example, the cross hatched portions in FIG. 5 illustrate portions of the uninvaded formations which can be expected to contribute to amplitude difference measurements taken at positions $r_1$ and $r_2$. Similarly, the difference in amplitude as between the positions $r_3$ and $r_4$ corresponds to the difference in amplitude attributable to formations lying between the lines 503 and 504 and including the cross hatched portions of the uninvaded formations.

It can be seen from the illustrations of FIGS. 4 and 5 that the attenuation measurements taken at receiver locations in the borehole are a function of the properties of formations which have a different extent than the formations which contribute to the measurements of phase taken at the same receiver locations; the attenuation measurement effectively looking "deeper" (in directions both radial and parallel with respect to the borehole) than the phase measurements. For example, attenuation measurements taken at positions $r_1$ and $r_2$ are substantially affected by the uninvaded formations whereas phase measurements taken at these same positions are not.

To obtain a better understanding of the invention, the embodiment of FIG. 1 will be set aside momentarily and some theoretical considerations will be set forth. First, consider a vertical magnetic dipole in a homogeneous medium of conductivity $\sigma$, magnetic permeability $\mu$, and relative dielectric constant $\epsilon'$. The voltage at a distance L from the source is $$V(L) = K_o j\omega\mu [1 - jkL] \frac{e^{jkL}}{L^3} \qquad (1)$$

where $K_o$ is a constant, $\omega = 2\pi f$ is the angular frequency of the source, j is the imaginary operator, and k is the complex propagation constant defined by $$k^2 = j\omega\mu\sigma + \frac{\omega^2}{c^2}\epsilon' \qquad (2)$$

where c is the speed of light. The complex propagation constant, k, can be represented as the sum of its real part, a, and its imaginary part, b, by $$k = a + jb \qquad (3)$$

Substituting (3) into (1) gives:

$$V(L) = K_o j\omega\mu [1 - jaL + bL] \frac{e^{-bL} e^{jaL}}{L^3} \qquad (4)$$

For a pair of spaced receivers located at $L_1$ and $L_2$, where $L_2$ is further from the transmitter than $L_1$, the relative attenuation is defined by $$\text{Atten.} = \frac{|V(L_2)|}{|V(L_1)|} \qquad (5)$$

From (4), $|V(L_1)|$ can be expressed as $$|V(L_1)| = K_o\omega\mu [(1 + bL_1)^2 + (aL_1)^2]^{\frac{1}{2}} \frac{e^{-bL_1}}{L_1^3} \qquad (6)$$

Similarly, $|V(L_2)|$ can be expressed as $$|V(L_2)| = K_o\omega\mu [(1 + bL_2)^2 + (aL_2)^2]^{\frac{1}{2}} \frac{e^{-bL_2}}{L_2^3} \qquad (7)$$

From (5), (6) and (7), we have $$\text{Atten.} = \frac{[(1 + bL_2)^2 + (aL_2)^2]^{\frac{1}{2}}}{[(1 + bL_1)^2 + (aL_1)^2]^{\frac{1}{2}}} \left(\frac{L_1}{L_2}\right) e^{-b(L_2 - L_1)} \qquad (8)$$

To determine the relative phase as between the wave energy at the two receivers, the phase angle, $\phi_1$, of the energy at the receiver at a distance $L_2$ is first calculated as:

$$\phi_{L2} = \tan^{-1}\left[\frac{K_o j\omega\mu (1 + bL_2) e^{-(bL_2)/L_2^3}}{K_o j\omega\mu (aL_2) e^{-(bL_2)/L_2^3}}\right] + aL_2 \qquad (9)$$

-continued $$\phi_{L2} = \tan^{-1}\left[\frac{1 + bL_2}{aL_2}\right] + aL_2 \qquad (10)$$

Similarly, the phase of the wave energy at the receiver at a distance $L_1$ is $$\phi_{L1} = \tan^{-1}\left[\frac{1 + bL_1}{aL_1}\right] + aL_1 \qquad (11)$$

The relative phase or phase difference, is then $$\Delta\phi = \phi_{L2} - \phi_{L1} = \qquad (12)$$

$$a(L_2 - L_1) + \tan^{-1}\left[\frac{1 + bL_2}{aL_2}\right] - \tan^{-1}\left[\frac{1 + bL_1}{aL_1}\right]$$

Relationships (8) and (12) are in terms of a and b from equation (3). Using relationships (2) and (3) and equating the real and imaginary parts, gives $$a^2 - b^2 = \frac{\omega^2 \epsilon'}{c^2} \qquad (13)$$

and $$2ab = \omega\mu\sigma \qquad (14)$$

Simultaneous solution of (13) and (14) yields $$a = \left\{\frac{\left[\frac{\omega^4}{c^4}\epsilon'^2 + (\omega\mu\sigma)^2\right]^{\frac{1}{2}} + \frac{\omega^2\epsilon'}{c^2}}{2}\right\}^{\frac{1}{2}} \qquad (15)$$

$$b = \left\{\frac{\left[\frac{\omega^4}{c^4}\epsilon'^2 + (\omega\mu\sigma)^2\right]^{\frac{1}{2}} - \frac{\omega^2\epsilon'}{c^2}}{2}\right\}^{\frac{1}{2}} \qquad (16)$$

These values of a and b can be substituted into relationships (8) and (12). Assume the distances $L_1$ and $L_2$ and the angular frequency, $\omega$, are known. Since the formations of interest are generally non-magnetic, $\mu$ can be considered a constant. Thus, when Atten. and $\Delta\phi$ have been measured, the two unknowns, $\epsilon'$ and $\sigma$, can be solved from the two equations (8) and (12).

Having obtained generalized equations, it will be understood that in the embodiment of FIG. 1 the attenuation information is obtained from the close receiver pair $R_1$, $R_2$, whereas the phase information is obtained from the far receiver pair $R_3$, $R_4$. Therefore, in equation (8) the distances $L_1$ and $L_2$ are respectively the distances from transmitter T to receivers $R_1$ and $R_2$, and in equation (12) the distances $L_1$ and $L_2$ are respectively the distances from transmitter T to receivers $R_3$ and $R_4$. Specific values will be applied hereinbelow.

Various techniques, well known in the art, could be employed to obtain and record $\epsilon'$ and/or $\sigma$ from equations (8) and (12), either at the well logging site or at a remote location (bearing in mind, as indicated, that the inputs to these equations will be from different receiver pairs). For example, a small general purpose digital computer can be loaded with a table of values of $\epsilon'$ and $\sigma$ corresponding to particular Atten. and $\Delta\phi$ values.

This could be done, for example, by inputting an array of values of $\epsilon'$ and $\sigma$, one pair at a time, into the equations (8) and (12). For each pair of input values, the equations are solved for Atten. and $\Delta\phi$. The particular pair $\epsilon'$ and $\sigma$ which are used to obtain the resultant values Atten. and $\Delta\phi$ are then stored in the table in conjunction with these values. Later, during operation, as values of Atten. and $\Delta\phi$ are obtained on lines 60A and 70A, the computer looks up the corresponding values of $\epsilon'$ and $\sigma$ in the stored table, and these values are recorded on recorder 95, as indicated by the outputs of block 100 in FIG. 1.

Figure 10:
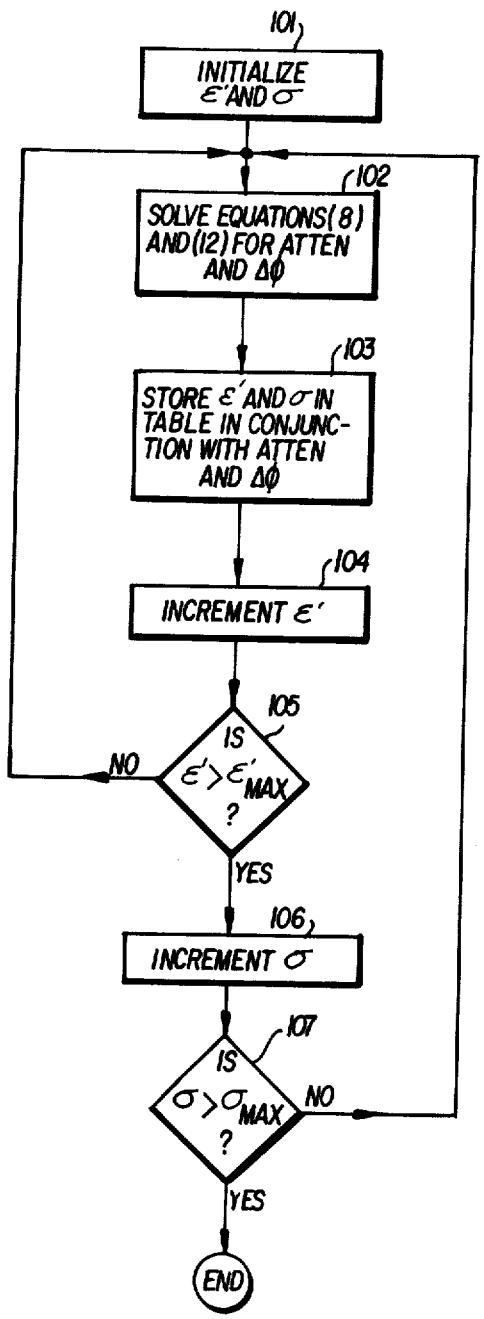
FIG. 10 is a simplified flow chart for programming of the computing means of FIG. 1.
Figure 11:
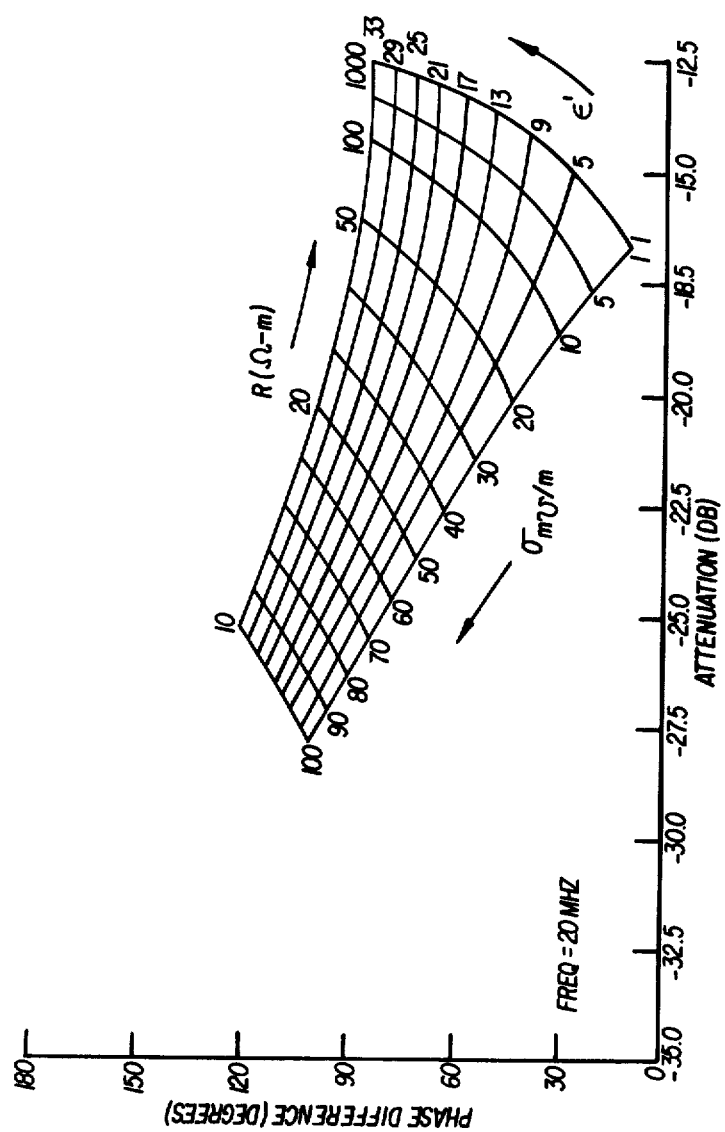
FIG. 11 is a graph of attenuation versus phase for various values of $\epsilon'$ and $\sigma$.

A simplified flow chart for programming the computing module 100 to store the table of values is shown in FIG. 10. Initial values of $\epsilon'$ and $\sigma$ are first selected, as indicated by the block 101. These values could typically be the lowest possible expected values of $\epsilon'$ and $\sigma$. Block 102 is then entered and represents the function of solving for Atten. and $\Delta\phi$ for using equations (8) and (12). The current values of $\epsilon'$ and $\sigma$ are then stored in conjunction with the calculated values of Atten. and $\Delta\phi$, as represented by the block 103. The value of $\epsilon'$ is then incremented, as represented by the block 104. $\epsilon'$ is then tested (diamond 105) to determine if it exceeds the maximum value of $\epsilon'$ to be used. If not, block 102 is reentered, and new values are stored in the table. When $\epsilon'$ has been incremented over its full range, the answer to the inquiry of diamond 105 will be "yes" and block 106 is entered, this block representing the incrementing of $\sigma$. $\sigma$ is then tested (diamond 107) to determine if it exceeds the maximum value of $\sigma$ to be utilized. If not, block 102 is again entered and, as previously described, a new set of values will be determined as $\epsilon'$ is iterated over its full range for this new value of $\sigma$. This procedure will continue until $\sigma$ exceeds its maximum value whereupon the routine is over and the full table of values has been stored. The calculated set of values can, if desired, be plotted as a graph, and FIG. 11 illustrates the type of graph obtained for a particular set of conditions (described hereinbelow), with Atten. and $\Delta\phi$ being plotted on the abscissa and ordinate, respectively, with families of curves for $\epsilon'$ and $\sigma$ being evident. It will be understood that once the graph is developed, it can be used to determine the correct values for $\epsilon'$ and $\sigma$ for a given pair of measurements of Atten. and $\Delta\phi$, such as by obtaining the output values graphically.

An alternative to the table look-up technique described above would be a curve matching technique using, for example, a least-squares process. Another alternative is to obtain solutions to equations (8) and (12) iteratively by selecting "guess" values and then incrementing them successively to converge to solutions. A still further possible approach is to provide a special purpose analog or digital computer which provides output functions that simulate the families of curves as shown in FIG. 11. It will also be recognized that by using the described logging device in suitably large test pit borehole, the appropriate stored values such as in FIG. 11 can be obtained empirically.

FIGS. 6-9 are useful in understanding the principles of the invention and in illustrating the extent of formations surrounding a borehole which influence measurements of attenuation and phase. Consider the simplified model of FIG. 6 wherein there is shown a borehole 132 filled with drilling mud and having a diameter (incuding of eight inches with conductivity and dielectric constant, as shown, of $\epsilon_m' = 70$ and $\sigma_m = 1$ mho/meter, typical of a relatively fresh water-based mud. A "fully" invaded zone 133, having a variable thickness to be designated, has a dielectric constant $\epsilon_{xo}' = 11$ and a conductivity $\sigma = 63$ millimho/meter. The region 134, which also has a variable thickness to be designated, is also invaded to some degree and is called a "transition" zone whose characteristics will be set forth momentarily. The uninvaded or virgin formation 131 is considered as having a dielectric constant $\epsilon_t' = 5.2$ and a conductivity $\sigma_t = 20$ millimhos/meter. The transition zone has an average diameter D and has a relatively smooth transition as between the dielectric constants and conductivities of its surrounding zones, the smooth transition being approximated by eight equal steps in the present model. The diameter of the fully invaded zone 133, designated D', is a fraction of the transition zone 134 diameter selected as 11/20 of D in this model. The dielectric constant and conductivity of the various zones are illustrated by the curves 6a and 6b, respectively, of FIG. 6.

Next, consider a transmitter, in the form of a 1.5 inch radius coil wound on a hollow mandrel, as being centrally located in the borehole at an origin position designated as depth $x=0$. Further consider a similar coil which serves as a receiver, centrally located in the borehole a distance x from the transmitter. For a selected average transition zone diameter $D_i$ and a selected frequency, for example 20 MHz, the magnitude and phase angle of the voltage at the receiver location x can be computed by solving Maxwell's equations for the multimedia model. This can be done, for example, using a recursive technique wherein one solves for the reflection coefficient at the farthest boundary, using the generalized wave equation, and then successively solves for the reflection coefficient at successively closer boundaries. Using this type of solution, and varying receiver location and average transition zone diameter, one can derive a table of voltage magnitude and voltage phase values for each of a plurality of receiver distances, $x_j$, each computed for a number of different transition zone diameters, $D_i$. In other words, a table of values for $|V|=f(x_j,D_i)$ and a table of values for $\sphericalangle V=g(x_j,D_i)$ can be set forth.

Having established a table of values, as described, one can study the relative depth of investigation attributable to both the phase and the attenuation measurements obtained by receiver pairs of different selected spacings. Before doing this, however, it is useful to consider second and third theoretical models to obtain baseline values from which "normalized" depth of investigation values can be obtained, in a manner which will become clear. The second theoretical model, illustrated in FIG. 7, is considered as having an invaded zone 133' of infinite extent; i.e., the invaded zone 133 from the FIG. 6 model extends outward to infinity. Using the second model, a listing of values, similar to the values of the table indicated above, except that in this case all have the same infinite diameter invaded zone, can be established; i.e., a list of values for $|V_{j\infty}|=f(x_j,D_\infty)$ and $\sphericalangle V_{j\infty}=g(x_j,D_\infty)$ where $D_\infty$ represents the infinite extent invaded zone.

Assume, now, that one selects a pair of distances, designated as $x_a$ and $x_b$ at which a pair of receivers are assumed to be respectively positioned. Using the listing of values associated with the second model (FIG. 7), the expected attenuation, designated $A_{ab\infty}$, and the expected relative phase, designated $\phi_{ab\infty}$, can be obtained from the voltage magnitudes and angles of the previously generated listing for the distances $x_a$ and $x_b$, as follows:

$$A_{ab\infty} = \frac{|V_{b\infty}|}{|V_{a\infty}|}$$

$$\phi_{ab\infty} = \sphericalangle V_{b\infty} - \sphericalangle V_{a\infty}$$

In the third theoretical model, shown in FIG. 8, there is no invasion and the formations are considered as having conductivity $\sigma_t$ and dielectric constant $\epsilon_t$ from the borehole outward. Using the third model, a listing of values, similar to the listing developed for the second model, can be established; i.e., a list of values for $|V_{jt}| = f(x_j, D_t)$ and $\sphericalangle V_{jt} = g(x_j, D_t)$, where $D_t$ represents the situation of no invasion, viz. virgin formation from the borehole outward. Once again, for a pair of distances $x_a$ and $x_b$ at which receivers are assumed to be respectively positioned, the expected attenuation, designated $A_{abt}$, and the expected phase, designated $\phi_{abt}$, can be obtained from the voltage magnitudes and angles of the previously generated listing for the distances $x_a$ and $x_b$, as follows:

$$A_{abt} = \frac{|V_{bt}|}{|V_{at}|}$$

$$\phi_{abt} = \sphericalangle V_{bt} - \sphericalangle V_{at}.$$

The normalized attenuation and normalized phase difference as between receivers at locations $x_a$ and $x_b$ can now be set forth, where the "normalizing" quantities are the developed attenuation and phase difference for the second model (infinite invaded zone) and for the third model (no invaded zone). By so doing, one can visualize the relative depth of investigation (as between situations of infinite invaded zone and no invaded zone) without undue influence on the presentation of any particular parameter, such as conductivity. (For example, variations in conductivity could yield quite different percentage contrasts in phase difference and attenuation as a function of average transition zone diameter for particular receiver spacings in the absence of normalization. The technique of normalizing allows one to study depth of investigation more objectively and with less effect by particular formation conductivity or dielectric constant parameters.)

In particular, the normalized attenuation, designated $A_{abn}(D_i)$, and the normalized phase, designated $\phi_{abn}(D_i)$ for receivers located at $x_a$ and $x_b$ and for an average transition zone diameter (model 1—FIG. 6) of $D_i$ are expressed as $$A_{abn}(D_i) = \frac{A_{ab}(D_i) - A_{abt}}{A_{ab\infty} - A_{abt}}$$

$$\phi_{abn}(D_i) = \frac{\phi_{ab}(D_i) - \phi_{abt}}{\phi_{ab\infty} - \phi_{abt}}$$

where $A_{ab}(D_i)$ and $\phi_{ab}(D_i)$ are obtained from the original table listing (model 1—FIG. 6) as $$A_{ab}(D_i) = \frac{|V_b(D_i)|}{|V_a(D_i)|}$$

$$\phi_{ab}(D_i) = \sphericalangle V_b(D_i) - \sphericalangle V_a(D_i)$$

It is seen from the expression for $A_{abn}(D_i)$ that normalized attenuation equals unity when $A_{ab}(D_i)$ equals $A_{ab\infty}$ (situation of infinite invaded zone), whereas normalized attenuation equals zero when $A_{ab}(D_i)$ equals $A_{abt}$ (situation of no invaded zone). Similarly, from the expression for $\phi_{abn}(D_i)$ it is seen that normalized phase equals unity when $\phi_{ab}(D_i)$ equals $\phi_{ab\infty}$ and normalized phase equals zero when $\phi_{ab}(D_i)$ equals $\phi_{abt}$.

Figure 9:
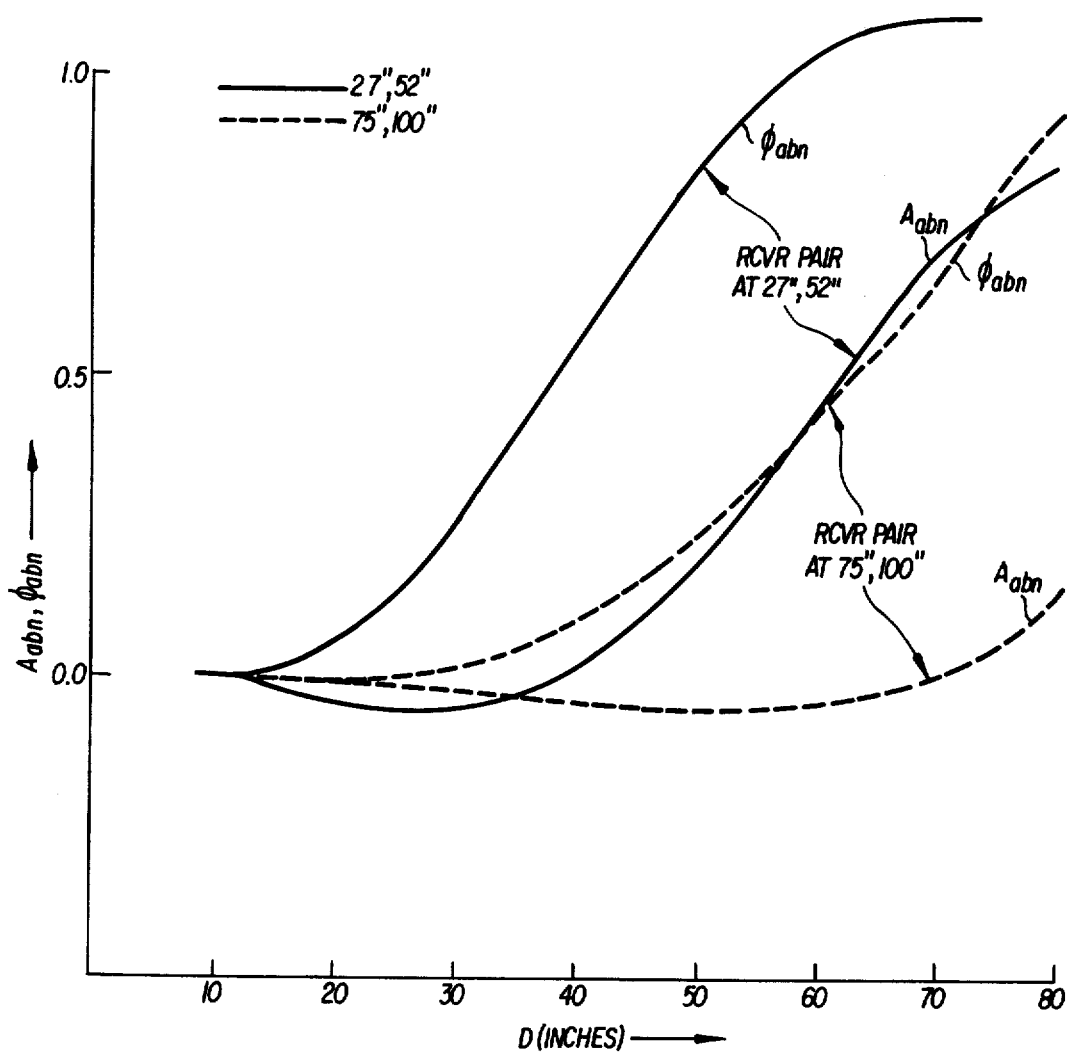
FIG. 9 is a graph of normalized amplitude and phase as a function of different diameters in the model of FIG. 6.

FIG. 9 is a graph of the normalized amplitude and phase, $A_{abn}$ and $\phi_{abn}$ as a function of different diameters, $D_i$, for the model of FIG. 6. The solid curves respectively represent $A_{abn}$ and $\phi_{abn}$ for a receiver pair positioned at $x_a = 27$ inches and $x_b = 52$ inches, whereas the dashed line curves represent $A_{abn}$ and $\phi_{abn}$ for a receiver pair positioned at $x_a = 75$ inches and $x_b = 100$ inches. A number of observations can be made from these normalized curves. Consider, first, the solid curves for $A_{abn}$ and $\phi_{abn}$ for the receiver pair located at $x_a = 27$ inches, $x_b = 52$ inches. It is seen from these curves that the attenuation measurement effectively looks "deeper" into the formation than does the phase measurement, confirming the discussion in conjunction with the generalized illustrations of FIGS. 4 and 5. For example, in a situation where $D_i$ of the model of FIG. 6 equals about 50 inches, the normalized phase is seen to be almost unity, which means that a relative phase measurement taken at these receiver spacings would yield almost the same relative phase reading as in a situation where there is an infinite invaded zone. Thus, the phase measurement will generally not "see" beyond 50 inches of invasion since the curve indicates that more than 50 inches of invasion will appear to be about the same, for this receiver pair spacing, as an infinite invaded zone. Stated another way, for an invaded zone of about 50 inches or more, the phase measurement will be relatively unaffected by the virgin formations beyond, for the parameters of the model of FIG. 6. On the other hand, it is seen from the solid curve for normalized attenuation, that at $D_i$ equals 50 inches the measured attenuation yields a normalized attenuation of less than about 0.3. This means that the attenuation reading at an invasion diameter of 50 inches will still be largely affected by the virgin formations. As seen from the curve, it is not until invasion exceeds about 80 inches that the normalized attenuation approaches unity; i.e. it is not until a situation of about 80 inches of invasion that the attenuation measurement will no longer be substantially influenced by the virgin formations, for the parameters of the model of FIG. 6.

The dashed line curves which respectively represent the normalized attenuation, $A_{abn}$, and normalized phase, $\phi_{abn}$, for a receiver pair positioned at $x_a = 75$ inches and $x_b = 100$ inches again illustrate that the attenuation measurement generally looks "deeper" into the formations than the phase measurement. For example, at an invaded zone diameter $D_i$ of 80 inches, the normalized phase is seen to be almost unity; i.e., measuring almost entirely the invaded zone. In contrast, the normalized attenuation, $A_{abn}$, is still close to zero, indicating that measurements of attenuation are still, at this degree of invasion, dominated by the virgin formations.

It is seen that the curve for normalized phase for receiver locations at $x_a = 75$ inches, $x_b = 100$ inches, and the curve for normalized attenuation for the receiver spacings $x_a = 27$ inches, $x_b = 52$ inches are a relatively close "match" over the full range of invasion diameters. The curves are also a good match over the range of invasion diameters for different models having other parameter values and other transition zone profiles (applicant having established that this is the case by computing curves for a number of different models). These spacings are accordingly selected as preferred spacings herein, although it will be understood that substantial variations are possible. For example, selection of spacings is related in part to selection of operating frequency, described hereinbelow. Also, it will be understood that other families of curves can be set forth with suitable matches being selected.

In selecting a suitable operating frequency, a number of considerations come into play. As frequency is increased, absorption of wave energy by the formations increases so that the received signal level decreases. Also, depth of investigation decreases as frequency increases. However, at higher frequencies, conductivity has a less dominant effect on the measurements, so the resolution of dielectric constant determination is improved. Accordingly, frequency of operation is selected to balance these countervailing considerations. An operating frequency of about 20 MHz is believed to provide adequate dielectric constant determination resolution while still allowing for sufficient signal strength at the receivers and sufficient depth of investigation.

The selection of receiver pair spacing and locations depends upon various factors and there is some latitude in these selections, consistent with the principles of the invention as set forth. In this respect, the following discussion of selection of preferred receiver locations and spacings should be considered as exemplary. To maximize depth of investigation, one can first select the furthest receiver, $R_4$, as being as far from the transmitter as practical. Limitations on the physical length of the logging tool (which must be efficiently moved through imperfect boreholes) and attenuation of the received signal over longer distances are limiting factors on the spacing of $R_4$. In view of these factors, a spacing of about 100 inches from the transmitter to $R_4$ is selected as yielding at least a minimum threshold signal level in relatively conductive formations. The position of the receiver of the "far" receiver pair, $R_3$, is next selected. $R_3$ should be sufficiently far from $R_4$ to provide good electrical resolution for the phase and/or attenuation measurements. On the other hand, the separation from $R_4$ should not be so great as to cause ambiguity in the phase measurement. Also, unduly wide spacing reduces logging resolution; i.e., the ability to detect relatively quickly changing formation characteristics (e.g. thin beds). In the present embodiment, the position of $R_3$ is selected as being about 25 inches from $R_4$, that is, about 75 inches from the transmitter. Having selected the location of the "far" receiver pair, which is employed in the main embodiment herein to obtain relative phase information, the location of the "close" receiver pair is then selected such that the depth of investigation of the relative attenuation information to be obtained from the "close" receiver pair is substantially matched with the depth of investigation of the relative phase information to be obtained from the "far" receiver pair. The technique described above for presenting normalized depth of investigation of different theoretical receiver pair spacings for a generalized model can be advantageously employed to obtain this match. As seen from the graph of FIG. 9, a "close" receiver pair spacing having $R_1$ located about 27 inches from the transmitter and having $R_2$ located about 52 inches from the transmitter provides a relatively close match (over a range of possible average transition zone diameters) of the attenuation measurement depth of investigation for $R_1$, $R_2$ with the relative phase measurement depth of investigation of $R_3$, $R_4$. In this instance, the spacing between the receivers of the "close" receiver pair is selected to be substantially the same as the spacing between receivers of the "far" receiver pair, i.e., about 25 inches, so that they have similar resolution capabilities.

FIG. 11 illustrates a graph of attenuation versus phase for various values of $\epsilon'$ and $\sigma$, when utilizing the preferred receiver pair spacings $R_1$, $R_2=27''$, $52''$ and $R_3$, $R_4=75''$, $100''$ as developed in conjunction with FIGS. 8 and 9. The curves may be generated in accordance with the technique set forth in conjunction with FIG. 10 for solving equations (8) and (12) to obtain values of $\epsilon'$ and $\sigma$ for each pair Atten, $\Delta\phi$. In particular, in equation (8) the distances $L_1$ and $L_2$ are $27''$ and $52''$, respectively (since the close receiver pair is used to obtain attenuation information), whereas in equation (12) the distances $L_1$ and $L_2$ are $75''$ and $100''$, respectively (since the far receiver pair is used to obtain phase information). As previously described, values of $\epsilon'$ and $\sigma$ can initially be stored (e.g. using the technique of FIG. 10) in computing module 100. A table look-up can then be employed, as values of Atten. and $\Delta\phi$ are received on lines 60A and 70A, to obtain output values of $\epsilon'$ and $\sigma$ for recording. Alternatively, as also noted above, iterative, curve matching, or analog computer techniques can be employed to generate recordable output values.

In accordance with a further aspect of the invention, an "ultra deep" conductivity determination can be made utilizing an attenuation measurement taken at the far receiver pair $R_3$, $R_4$. In accordance with this technique, the dielectric constant of the formations is first determined using the apparatus and method already described; i.e., utilizing the attenuation measurement from the close receiver pair $R_1$, $R_2$ in conjunction with the phase measurement from the far receiver pair $R_3$, $R_4$, and employing these values in the relationships (8) and (12) to obtain a determination of the dielectric constant (or electric permittivity) of the formations. Now, with $\epsilon'$ as a "known," the attenuation measurement taken at the far receiver pair can be used in relationship (8), replacing the distances from T to $R_1$ and $R_2$ with the distances from T to $R_3$ and $R_4$, to solve for $\sigma$, the value of $\sigma$ obtained in this manner being designated as $\sigma_{ud}$. It will be understood that the $\epsilon'$ employed in solving for $\sigma_{ud}$ represents the dielectric constant of somewhat shallower formations than those which contribute to the attenuation measurement taken at the far receiver pair, $R_3$, $R_4$. However, in most cases this will not give rise to a substantial percentage error in determination of $\sigma_{ud}$.

Figure 12:
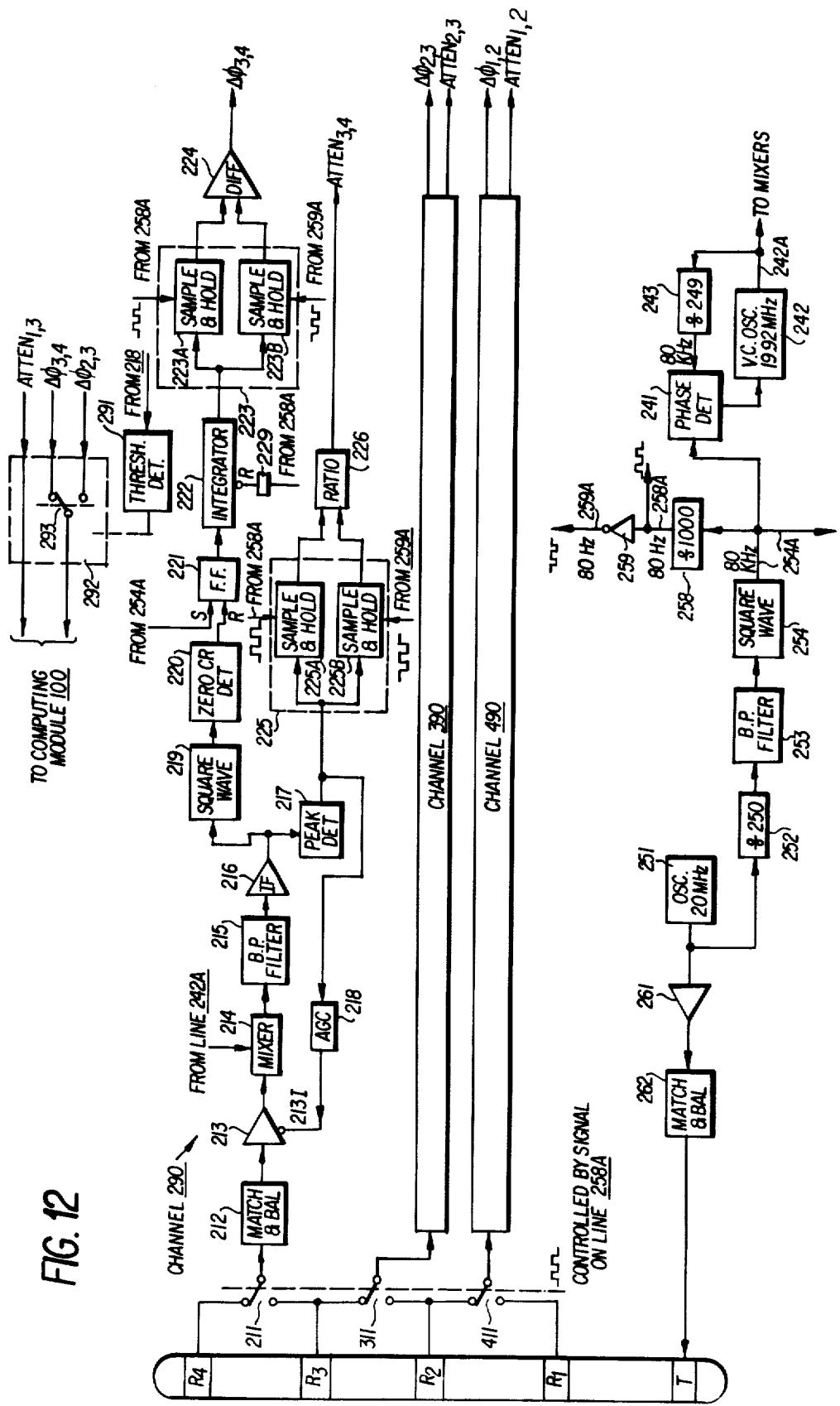
FIG. 12 is a schematic block diagram of another embodiment of the invention.

Referring to FIG. 12, there is illustrated an embodiment of the invention wherein attenuation and phase information from each of a plurality of receiver pairs is obtained using single channel processing. In particular, a measurement of amplitude and/or phase of the wave energy received at one receiver of a particular receiver pair is obtained utilizing a single processing channel coupled to the receiver in question. The determined value of amplitude and/or phase is stored and the same processing channel is then coupled to the other receiver of the receiver part. An amplitude and phase measurement associated with this other receiver is then obtained and stored, and the two stored values of amplitude and/or the two stored values of phase are then utilized to obtain the desired values of attenuation and/or relative phase difference of the electromagnetic wave energy received at the particular receiver pair. In the embodiment of FIG. 12, circuitry is illustrated as being available for obtaining attenuation and phase difference measurements for each of three receiver pairs, viz. $R_1R_2$, $R_2R_3$, and $R_3R_4$. In other words, the circuitry is for the generalized case wherein any or all of the obtained values can be utilized in accordance with the principles of the invention. However, it will be understood that less than all of this information may be utilized for a particular application, and, if desired, portions of the circuitry can be omitted for applications of the invention wherein the outputs of such circuit portions are not utilized; i.e., either recorded or utilized by the computing module 100. The embodiment of FIG. 12 also sets forth an implementation of the feature of the invention whereby at least one measurement obtained from closer receivers is substituted for a measurement which would normally be taken at more remote receivers in instances where the information from the more remote receivers does not meet a predetermined standard. This situation might typically occur in relatively conductive formations wherein signal attenuation prevents a sufficiently strong signal from being received at the more remote receivers.

Regarding the specifics of FIG. 12, a transmitter T and four receivers designated $R_1$, $R_2$, $R_3$ and $R_4$ are again provided. As in FIG. 1, these receivers may typically comprise coils which are disposed in successively spaced relation on a sonde. The transmitter T is energized, in the present embodiment, with a 20 MHz signal from an oscillator 251. The output of oscillator is coupled, via amplifier 261 and matching and balancing circuit 262, to the transmitter T. The timing signals utilized for switching as between different receivers as well as for switching in the receiver circuitry is obtained by dividing the 20 MHz signal by 250 and then by 1000, as indicated by the frequency dividers 252 and 258. The frequency divided signal is band pass filtered by filter 253 and converted to a square wave by square wave circuit 254. The resultant output on line 254A is an 80 KHz square wave which is coupled to one input of phase detector 241. The signal on line 254A is also coupled to divide-by-1000 frequency divider 258 whose output, 258A is further coupled to an inverter 259 which produces an output on a line 259A. The signals on lines 258A and 259A are utilized in the receiver circuitry in a manner to be described. The phase detector 241 is part of a loop which includes a voltage controlled oscillator 242 and a frequency divider 243. The voltage controlled oscillator 242 has a characteristic frequency around 19.92 MHz; viz., 80 KHz less than the 20 MHz frequency of oscillator 251. The 19.92 MHz signal is divided by 249 to obtain an 80 KHz signal which is coupled to the other input of phase detector 241. If a difference occurs between the two derived 80 KHz signals, an error signal is output from phase detector 241 and tends to correct the output frequency of the voltage controlled oscillator 242 so as to maintain an 80 KHz frequency difference as between the two oscillators 251 and 242.

The outputs of receivers $R_1$ and $R_2$ are respectively coupled to the input terminals of a switch 411, the receivers $R_2$ and $R_3$ are respectively coupled to the input terminals of a switch 311, and the receivers $R_3$ and $R_4$ are respectively coupled to the input terminals of a switch 211. Each of the switches 211, 311 and 411 is operative to couple one or the other of its inputs to its output, under control of the 80 Hz timing signal on line 258A. The outputs of switches 211, 311 and 411 are respectively coupled to the inputs of processing channels designated 290, 390 and 490. Processing channel 290 includes a matching and balancing circuit 212 which is coupled to a preamplifier 213 having a gain control input designated 213I. The output of preamplifier 213 is coupled to a mixer 214 which receives, at its other input terminal, a signal on a line 242A. As previously described, this signal has a frequency of 19.92 MHz and is different from the transmitter frequency by 80 KHz. It was noted with respect to the embodiment of FIG. 1 that this technique facilitates measurement of amplitude and/or phase information by allowing detection to be performed at a lower frequency while still maintaining the inherent amplitude and phase information of the received electromagnetic wave energy. The output of mixer 214 is coupled through a band pass filter 215 which passes a suitable frequency band, centered at 80 KHz, to an intermediate frequency amplifier 216. The output of amplifier 216 is coupled to both a peak detector 217 and a square wave circuit 219 which may typically comprise a Schmitt trigger. The output of peak detector 217 is coupled to an automatic gain control circuit 218 whose output is fed back to the control terminal of preamplifier 213. (The AGC preferably has a relatively long time constant and does not substantially modify successive signals received at the two receivers to which the particular channel is coupled.) The output of the peak detector 217, which produces a signal representative of the envelope of the electromagnetic wave energy received at the receiver to which the processing channel 290 is instantaneously coupled, is also coupled to a storage circuit 225. In the present embodiment, the storage circuit includes a pair of sample and hold circuits 225A and 225B which are operative to sample the input signal under control of the timing signals on lines 258A and 259A. In particular, the sample and hold circuit 225A is triggered to sample the input signal upon the positive-going excursion of the timing signal on line 258A, whereas the sample and hold circuit 254B is adapted for triggering by the positive-going excursions of the opposite polarity timing signal on line 259A. The two outputs of storage circuit 225 are coupled to a ratio circuit 226 which generates an output representative of the ratio of the electromagnetic wave energy envelope received at receiver $R_4$ with respect to the same received at receiver $R_3$; i.e. an attenuation designated $Atten_{3,4}$.

The output of amplifier 216 is also coupled to a square wave circuit 219 whose output is, in turn, coupled to a zero-crossing detector 220. The output of zero-crossing detector is coupled to the reset input of a flip-flop 221. The set input of flip-flop 221 receives the signal on line 254A. The output of flip-flop 221 is integrated by integrator 222 which generates an output signal that is proportional to the width of the output pulse from flip-flop 221 and is accordingly proportional to the time during which flip-flop 221 was "on". Integrator 222 is reset, via delay 229, by both the positive-going and negative-going excursions of the 80 Hz signal from line 258A. The output of integrator 222 is coupled to a storage circuit 223 which is similar to the storage circuit 225 in that it includes a pair of sample and hold circuits 223A and 223B which are respectively triggered to sample by the oppositely phased square waves on lines 285A and 259A. The two outputs of storage circuit 223 are coupled to a difference amplifier 224 which produces an output designated $\Delta\phi_{3,4}$. In operation, it is readily seen that $\Delta\phi_{3,4}$ will be representative of the phase difference as between the electromagnetic energy received at receivers R₃ and R₄. During the time when the processing channel 290 is coupled to the receiver R₃, phase measurements are taken on the arriving signal with respect to a reference, the reference being the 80 KHz signal on line 254A which is related to the energizing signal coupled to the transmitter T. This reference signal sets the flip-flop 221, and it is reset by virtue of the signal arriving at R₃ via channel 290. Thus, for each cycle of the 80 KHz square wave the flip-flop 221 produces an output pulse whose duration is representative of the relative phase of the electromagnetic wave energy arriving at receiver R₃. The pulses are averaged by integrator 222, so the value which is stored in the sample and hold circuit 223A of storage circuit 223 is representative of a phase measurement of the electromagnetic wave energy arriving at receiver R₃. When the processing channel 290 is switched to be coupled to receiver R₄, the same reference is again used to set the flip-flop 221, but in this case it is reset by a signal derived from the elecromagnetic wave energy arrival at receiver R₄. Accordingly, the value stored in sample and hold circuit 223B of storage circuit 223 is representative of the corresponding phase measurement for the electromagnetic wave energy received at receiver R₄. The difference between these two phases is obtained using difference amplifier 224 whose output, as indicated, is designated as $\Delta\phi_{3,4}$.

The channels 390 and 490 may have configurations similar to that of channel 290 as described. Typically, determination of dielectric constant and/or conductivity, as described hereinabove, will be made employing $Atten_{1,2}$ and $\Delta\phi_{3,4}$. FIG. 12 illustrates these signals, and also $\Delta\phi_{2,3}$, as being coupled, via block 292, to computing module 100 (FIG. 1). The block 292 includes a switch 293 which couples either $\Delta\phi_{3,4}$ or $\Delta\phi_{2,3}$ to computing module 100 under control of the output of threshold detector 291. The threshold detector 291 receives as its input the signal from AGC circuit 218; i.e., a signal representative of the wave energy amplitude received at R₃, R₄. When AGC amplification exceeds a predetermined threshold, the received signal levels at R₃, R₄ is considered insufficient and $\Delta\phi_{2,3}$ is coupled to computing module 100 for processing. The output of threshold detector 291, which is determinative of the status of switch 293, is also transmitted uphole and recorded so that it is clear which receiver pair is being utilized.

The invention has been described with reference to particular embodiments, but variations within the spirit and scope of the invention will occur to those skilled in the art. For example, while a differential receiver arrangement is illustrated as being preferably employed to obtain attenuation measurements, it will be understood that direct measurements of amplitude can be utilized. However, the differential receiver arrangement is preferred in that it minimizes borehole effects and the effects of invasion on the measurements. For example, the graph of FIG. 11 substantially applies for boreholes of various diameters, whereas a corresponding graph of phase difference versus amplitude (direct measurement) would apply only for a particular borehole diameter, with different graphs being needed for different borehole diameters.

I claim:

1. Apparatus for determining the dielectric constant and/or conductivity of earth formations surrounding a borehole, comprising:

means for generating electromagnetic wave energy at a first location in the borehole;

means for detecting the relative attenuation of the electromagnetic wave energy at a second location in the borehole to obtain an attenuation-representative signal at one effective spacing;

means for detecting the relative phase of the electromagnetic wave energy at a third location in the borehole to obtain a phase-representative signal at another effective spacing;

said second location being between said first and third locations so that said one spacing is shorter than said another spacing;

said spacings being such as to cause said attenuation-representative signal and said phase-representative signal to be representative of the effects of formations at substantially the same depth of investigation; and means responsive to said phase-representative signal and said attenuation-representative signal for determining the dielectric constant and/or conductivity of said formations by combining said signals from different spacings.

2. Apparatus as defined by claim 1 wherein said second location is spaced approximately halfway between said first and third locations.

3. Apparatus for determining the dielectric constant and/or conductivity of earth formations at substantially a given depth of investigation from a borehole, comprising:

means for generating electromagnetic wave energy at a first location in the borehole;

a pair of spaced receivers for detecting the relative attenuation of the electromagnetic wave energy at a second location in the borehole;

means for detecting the relative phase of the electromagnetic wave energy at a third location in the borehole;

said second location being between said first and third locations; and means for determining the dielectric constant and/or conductivity of said formations at substantially a given depth of investigation from the borehole by combining the detected attenuation and phase.

4. Apparatus as defined by claim 3 wherein said means for detecting relative phase comprises a second pair of spaced receivers at the third location, and means for detecting the relative phase as between the electromagnetic wave energy received at the receivers of said second pair.

5. Apparatus as defined by claim 3 wherein said pair of receivers comprises a pair of spaced receiver coils.

6. Apparatus as defined by claim 4 wherein said first and second pairs of receivers each comprise a pair of spaced receiver coils.

7. Apparatus as defined by claim 6 wherein said means for generating electromagnetic energy comprises a transmitter coil and electromagnetic energizing means coupled to the transmitter coil.

8. Apparatus as defined by claim 6 wherein the frequency of said electromagnetic energy is in the range of about 10 MHz to 100 MHz.

9. Apparatus as defined by claim 8 wherein the frequency of said electromagnetic energy is about 20 MHz.

10. Apparatus as defined by claim 9 wherein said second location is spaced approximately halfway between said first and third locations.

11. Apparatus as defined by claim 8 wherein the four receivers are approximately equally spaced with about a two foot spacing between receivers.

12. Apparatus for determining the dielectric constant and/or conductivity of earth formations at substantially a given depth of investigation from a borehole, comprising:
- means for generating electromagnetic wave energy at a first location in the borehole;
- means for detecting the relative attenuation of the electromagnetic wave energy at a second location in the borehole;
- a pair of spaced receivers for detecting the relative phase of the electromagnetic wave energy at a third location in the borehole;
- said second location being between said first and third locations; and
- means for determining the dielectric constant and/or conductivity of said formations at substantially a given depth of investigation from the borehole by combining the detected attenuation and phase.

13. Apparatus as defined by claim 12 wherein said pair of receivers comprises a pair of spaced receiver coils.

14. A method for determining the dielectric constant and/or conductivity of earth formations surrounding a borehole, comprising the steps of:
- generating electromagnetic wave energy at a first location in the borehole;
- detecting the relative attenuation of the electromagnetic wave energy at a second location in said borehole to obtain an attenuation-representative signal at one effective spacing;
- detecting the relative phase of the electromagnetic wave energy at a third location in said borehole to obtain a phase-representative signal at another effective spacing;
- said second location being between said first and third locations so that said one spacing is shorter than said another spacing;
- said spacings being such as to cause said attenuation-representative signal and said phase-representative signal to be representative of the effects of formations at substantially the same depth of investigation; and
- determining the dielectric constant and/or conductivity of said formations by combining said signals from different spacings.

15. The method as defined by claim 14 wherein the frequency of said electromagnetic energy is in the range of about 10 MHz to 100 MHz.

16. The method as defined by claim 15 wherein the frequency of said electromagnetic energy is about 20 MHz.

17. The method as defined by claim 14 wherein said second location is spaced approximately halfway between said first and third locations.

18. The method as defined by claim 15 wherein said second location is spaced approximately halfway between said first and third locations.

19. A method for determining the dielectric constant and/or conductivity of earth formations at substantially a given depth of investigation from a borehole, comprising the steps of:
- generating electromagnetic wave energy at a first location in the borehole;
- detecting the relative attenuation of the electromagnetic wave energy with a pair of spaced receivers at a second location in said borehole;
- detecting the relative phase of the electromagnetic wave energy at a third location in said borehole;
- said second location being between said first and third locations; and
- determining the dielectric constant and/or conductivity of said formations at substantially a given depth of investigation from the borehole by combining the detected attenuation and phase.

20. The method as defined by claim 19 wherein the step of detecting relative phase comprises providing a second pair of spaced receivers at the third location, and detecting the relative phase as between the electromagnetic wave energy received at the receivers of said second pair.

21. The method as defined by claim 20 wherein said second location is spaced approximately halfway between said first and third locations.

22. Apparatus for determining the dielectric constant of earth formations surrounding a borehole, comprising:
- means for generating electromagnetic wave energy at a first location in the borehole;
- means for detecting the relative attenuation of the electromagnetic wave energy at a second location in the borehole to obtain an attenuation-representative signal at one effective spacing;
- means for detecting the relative phase shift of said electromagnetic wave energy at a third location in the borehole to obtain a phase-representative signal at another effective spacing;
- said second location being between said first and third locations so that said one spacing is shorter than said another spacing;
- said spacings being such as to cause said attenuation-representative signal and said phase-representative signal to be representative of the effects of formations at substantially the same depth of investigation; and
- means responsive to said phase-representative signal and to said attenuation-representative signal for determining the dielectric constant of said formations by combining said signals from different spacings.

23. A method for determining the dielectric constant and/or conductivity of earth formations at substantially a given depth of investigation from a borehole, comprising the steps of:
- generating electromagnetic wave energy at a first location in the borehole;
- detecting the relative attenuation of the electromagnetic wave energy at a second location in said borehole;
- detecting the relative phase of the electromagnetic wave energy with a pair of spaced receivers at a third location in said borehole;
- said second location being between said first and third locations; and
- determining the dielectric constant and/or conductivity of said formations at substantially a given depth of investigation from the borehole by combining the detected attenuation and phase.

24. Apparatus for determining the dielectric constant of earth formations at substantially a given depth of investigation from a borehole, comprising;
- means for generating electromagnetic wave energy at a first location in a borehole;
- a pair of spaced receivers for detecting the relative attenuation of the electromagnetic wave energy at a second location in the borehole;

means for detecting the relative phase shift of said electromagnetic wave energy at a third location in the borehole;

said second location being between said first and third locations; and means for determining the dielectric constant of said formations of substantially a given depth of investigation from the borehole by combining the detected attenuation and phase.

25. Apparatus as defined by claim 24 wherein said means for detecting relative phase comprises a second pair of spaced receivers at the third location, and means for detecting the relative phase as between the electromagnetic wave energy received at the receivers of said second pair.

26. Apparatus as defined by claim 25 wherein said second location is spaced approximately halfway between said first and third locations.

27. Apparatus as defined by claim 26 wherein the frequency of said electromagnetic energy is in the range of about 10 MHz to 100 MHz.

28. Apparatus as defined by claim 27 wherein the frequency of said electromagnetic energy is about 20 MHz.

29. Apparatus for determining the conductivity of earth formations surrounding a borehole, comprising:

means for generating electromagnetic wave energy at a first location in the borehole;

means for detecting the relative attenuation of the electromagnetic wave energy at a second location in the borehole to obtain an attenuation-representative signal at one effective spacing;

means for detecting the relative phase shift of said electromagnetic wave energy at a third location in the borehole to obtain a phase-representative signal at another effective spacing;

said second location being between said first and third locations so that said one spacing is shorter than said another spacing;

said spacings being such as to cause said attenuation-representation signal and said phase-representative signal to be representative of the effects of formations at substantially the same depth of investigation; and means responsive to said phase-representative signal and to said attenuation-representative signal for determining the conductivity of said formations by combining said signals from different spacings.

30. Apparatus for determining the conductivity of earth formations at substantially a given depth of investigation from a borehole, comprising:

means for generating electromagnetic wave energy at a first location in the borehole;

a pair of spaced receivers for detecting the relative attenuation of the electromagnetic wave energy at a second location in the borehole;

means for detecting the relative phase shift of said electromagnetic wave energy at a third location in the borehole;

said second location being between said first and third locations; and means for determining the conductivity of said formations at substantially a given depth of investigation from the borehole by combining the detected attenuation and phase.

31. Apparatus as defined by claim 30 wherein said means for detecting relative phase comprises a second pair of spaced receivers at the third location, and means for detecting the relative phase as between the electromagnetic wave energy received at the receivers of said second pair.

32. Apparatus as defined by claim 31 wherein said second location is spaced approximately halfway between said first and third locations.

33. Apparatus as defined by claim 32 wherein the frequency of said electromagnetic energy is in the range of about 10 MHz to 100 MHz.

34. Apparatus as defined by claim 33 wherein the frequency of said electromagnetic energy is about 20 MHz.

35. Apparatus for determining the dielectric constant and/or conductivity of earth formations surrounding a borehole, comprising:

means for deriving, at one effective spacing, the relative attenuation of electromagnetic wave energy passed between first and second locations in the borehole;

means for deriving, at another effective spacing, the relative phase of electromagnetic wave energy passed between said first location and a third location in the borehole;

the second location being between the first and third locations so that said one spacing is shorter than said another spacing;

said spacings being such as to cause said attenuation-representative signal and said phase-representative signal to be representative of the effects of formations at substantially the same depth of investigation; and means for generating a signal representative of the dielectric constant and/or conductivity of said formations by combining the attenuation and phase derived from different spacings.

36. A method for determining the dielectric constant and/or conductivity of earth formations surrounding a borehole, comprising the steps of:

deriving, at one effective spacing, the relative attenuation of electromagnetic wave energy passed between first and second locations in the borehole;

deriving, at another effective spacing, the relative phase of electromagnetic wave energy passed between said first location and a third location in the borehole;

a second location being between the first and third locations so that said one spacing is shorter than said another spacing;

said spacings being such as to cause said attenuation-representative signal and said phase-representative signal to be representative of the effects of formations at substantially the same depth of investigation; and generating a signal representative of the dielectric constant and/or conductivity of said formations by combining the attenuation and phase derived from different spacings.

37. Apparatus for determining the conductivity of earth formations surrounding a borehole, comprising:

means for generating electromagnetic wave energy at a first location in the borehole;

means for detecting the relative attenuation of the electromagnetic wave energy at a second location in the borehole;

means for detecting the attenuation and the relative phase shift of the electromagnetic wave energy at a third location in the borehole;

said second location being between said first and third locations;

means for deriving the dielectric constant of said formations as a function of said attenuation detected at said second location and the phase shift detected at said third location; and means for determining the conductivity of said formations by combining said derived dielectric constant and the attenuation detected at said third location.

38. Apparatus for determining the dielectric constant and/or conductivity of earth formations of substantially a given volume and shape surrounding a borehole, comprising:

a transmitter for generating electromagnetic wave energy in the borehole;

first, second, third and fourth receivers spaced successively from the transmitter location in the borehole;

first and second processing channels, said first processing channel being switchably coupleable to said first receiver or said second receiver, said second processing channel being switchably coupleable to said third receiver or said fourth receiver;

an attenuation detector coupled to said first processing channel, said attenuation detector being operative to compare the amplitude of the electromagnetic wave energy received at said second receiver when said first processing channel is coupled thereto to the amplitude of the electromagnetic wave energy received at said first receiver when said first processing channel is coupled thereto;

phase comparator means coupled to said second processing channel and operative to compare the phase of the electromagnetic wave energy received at the fourth received when the third processing channel is coupled thereto to the phase of the electromagnetic wave energy received at the third receiver when the third processing channel is coupled thereto;

means for determining the dielectric constant and/or conductivity of said formations of substantially a given volume and shape by combining the output of said amplitude detector and said phase comparator means.

* * * * *